United States Patent

[11] 3,595,463

[72] Inventors: Sergei Ivanovich Fadeev;
Viktor Epifanovich Gora; Arkadyalexeevich Khasin-Dubrovsky, all of Moscow, U.S.S.R.
[21] Appl. No.: 751,811
[22] Filed: Aug. 12, 1968
[45] Patented: July 27, 1971
[73] Assignee: Spetsialnoe Proektno-Tekhnologichesko-Konstruktorskoe Bjuro Glavnogo Upravlenia Puti I Sooruzkeny MPS SSSR Moscow, U.S.S.R.

[54] TRANSPORTABLE MACHINE FOR BUTT-WELDING OF RAILS
8 Claims, 6 Drawing Figs.

[52] U.S. Cl. .................................................. 228/44,
29/200, 29/429, 29/484, 219/101, 219/156,
219/161, 228/4, 228/7
[51] Int. Cl. .................................................. B23k 19/00
[50] Field of Search ...................................... 228/4, 5, 7,
45, 44; 219/101, 156, 161; 269/287; 29/484, 429

[56] References Cited
UNITED STATES PATENTS
| | | | |
|---|---|---|---|
| 2,250,869 | 7/1941 | Jones et al. | 219/101 |
| 2,231,014 | 2/1941 | Lytle et al. | 29/430 |
| 2,124,849 | 7/1938 | Drain, Jr. | 228/5 |
| 925,630 | 6/1909 | Goldschmidt et al. | 228/4 |

Primary Examiner—John F. Campbell
Assistant Examiner—Robert J. Craig
Attorney—Waters, Roditi, Schwartz and Nissen ABSTRACT: A transportable machine for the but-welding of rails under field conditions. The machine is provided with a stationary pincer clamp for fixing a first rail to be welded, a movable pincer clamp for fixing another rail to be welded to the first rail, a common axle on which the pincer clamps are mounted, a drive for displacing the movable pincer clamp, a hydraulic cylinder for turning the clamping jaws of the stationary pincer clamp, a hydraulic cylinder for turning the clamping jaws of the movable pincer clamp, at least two profile cutters rigidly secured to the clamping jaws of the movable pincer clamp and having a form contoured to the head and side portions of the rail in cross section, at least one lower cutter mounted on one of the pincer clamps and adapted to reciprocate transversely in relation to the longitudinal axis of the rail, the lower cutter having a cutting edge which coincides with the plane of the rail foot.

TRANSPORTABLE MACHINE FOR BUTT-WELDING OF RAILS

The present invention relates to transportable machines for the butt-welding of workpieces, and more specifically, for the pressure-contact welding of rails, under field conditions.

Known in the prior art are transportable field welders for the butt-welding of rails comprising movable and stationary pincer clamps for fixing the rails to be welded, a hydraulic drive for actuating the movable pincer clamp and a device for deburring the butt weld (cf. Inventor's Certificate No. 144714, of the USSR, 1962).

In the welder for the pressure-gas welding of rails, the device for cutting off the weld burr consists of two removable members put on the rail after completing the welding operation and secured thereon. The removable members of the device are equipped with cutters for cutting off the weld burr.

This device is positioned between the pincer clamps and performs the cutting of the weld burr by the aid of the cutters of the movable pincer clamp which is moved by hydraulic cylinders.

The butt-welding machine known heretofore has a number of disadvantages; namely during the operation, it is difficult to mount, connect and remove both members of the cutting device; a rather long period of time is required for putting the device into operation, during which time the temperature of the weld burr considerably decreases, thus involving greater forces to be applied for cutting off the burr. All this results in a low efficiency of the welding machine.

An object of the present invention is to provide a simple device, reliable and convenient in operation, for cutting off a burr of a butt weld, adapted for mounting on a transportable machine for the butt-welding of rails under field conditions.

According to this and other objects, the invention provides a transportable machine for the butt-welding of rails under field conditions including a device for cutting off the weld burr which comprises at least two profile cutters rigidly secured on the clamping jaws of the movable pincer clamp and embracing the head and side portions of the rail in the cross section, and at least one lower cutter mounted on one of the pincer clamp and adapted to reciprocate in the direction at right angles to the longitudinal axis of the rail so that its cutting edge coincides with the plane of the rail foot.

To insure the reciprocating motion of the lower cutter in the transverse direction in relation to the longitudinal axis of the rail, it is advantageous to employ at least one hydraulic cylinder fixed to one of the pincer clamps, the rod of the hydraulic cylinder being connected to this cutter.

The hydraulic cylinder for displacing the lower cutter is preferably mounted on one of the clamping jaws of the stationary pincer clamp, the cutting edge of the lower cutter being disposed so that the cutting of the weld burr is effected in the transverse direction in relation to the longitudinal axis of the rail.

The hydraulic cylinder can be mounted on at least one clamping jaw of the movable pincer clamp, the rod of the cylinder being connected to the lower cutter, whose cutting edge is disposed so that during the travel of the movable pincer clamp the cutting of the weld burr is effected in the direction parallel to the longitudinal axis of the rail.

The lower cutter is preferably arranged in guides mounted on the movable pincer clamp by the aid of at least one bracket.

Other objects and advantages of the invention will become more fully apparent to those skilled in the art from a consideration of the following description to be had in conjunction with the appended drawings, in which.

Figure 1:
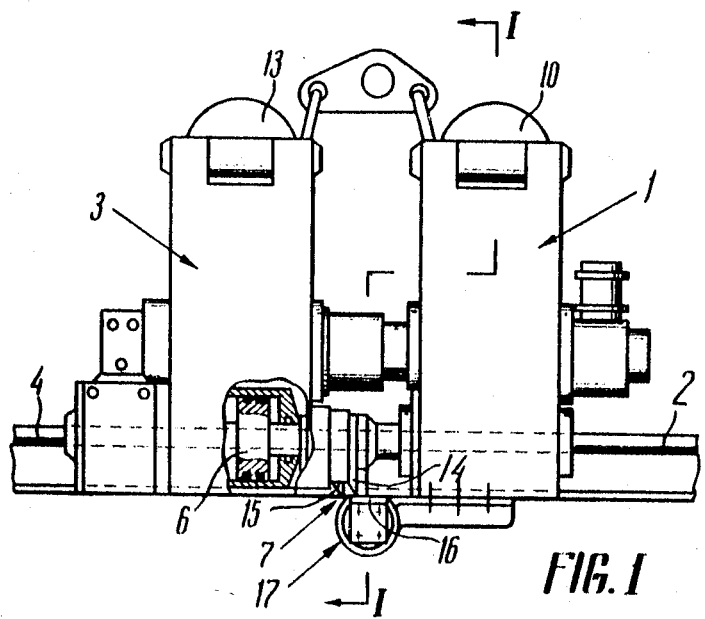
FIG. 1 is a side view of the transportable machine for the butt-welding of rails under field conditions, provided with a device for cutting off the burr of the butt weld, the hydraulic cylinder for displacing the lower cutter being mounted on the stationary pincer clamp.

In the description of the exemplary embodiment of the present invention, a concrete terminology is used for the sake of clarity. However, it is necessary to remember that the invention is not limited by the terms so adopted, and each of these terms covers all identical elements operating in a similar way and employed for obtaining the same results.

The transportable machine for the butt-welding of rails under field conditions comprises a stationary pincer clamp 1 (FIGS. 1, 2 and 3) for fixing the rail to be welded, a movable pincer clamp 3 for fixing the other rail 4 to be welded, a common axle 5 (FIG. 2) on which these clamps are mounted, two hydraulic cylinders 6 (FIG. 1) for displacing the movable pincer clamp 3, and a device 7 for cutting off the burr of the butt weld.

The stationary pincer clamp comprises two clamping jaws 8 and 9 (FIG. 2) mounted on the axle 5 and adapted for turning only about this axle when clamping and releasing the rail being welded. The turning of the clamping jaws 8 and 9 is effected by the hydraulic cylinder 10 mounted on the upper arms of the stationary pincer clamp.

The clamping jaws 8 and 9 can also be turned by other mechanisms, whose design is not shown on the drawings.

The movable pincer clamp 3 (FIGS. 4 and 5) is composed of two clamping jaws 11 and 12 mounted on the above-mentioned axle 5 and adapted for turning about it when clamping and releasing the rail 4 being welded, with the possibility of longitudinal movement along said axle during the welding operation and when cutting off the burr of the butt weld. The clamping jaws 11 and 12 are turned by a hydraulic cylinder 13 mounted on the upper arms of the movable pincer clamp 3. The turning of the clamping jaws 11 and 12 can also be performed by any other appropriate mechanism.

According to the invention, the device 7 for cutting off the weld burr is composed of two profile cutters 14 and 15 rigidly secured on the clamping jaws 11 and 12 of the movable pincer clamp 3 and a lower cutter 16 mounted on one of the pincer clamps 1 or 3 (FIG. 1) with the possibility of reciprocating in the transverse direction in relation to the longitudinal axis of the rail so that its cutting edge coincides with the plane of the rail foot.

The profile cutters 14 and 15 embrace the head and side portions of the rail crosswise.

The reciprocating motion of the lower cutter 16 in the transverse direction in relation to the longitudinal axis of the rail is effected by at least one hydraulic cylinder 17 whose rod 18 (FIG. 2) is connected to this cutter.

The device 7 for cutting off the weld burr, according to the invention, may have different variations of mounting of the hydraulic cylinder 17 on the pincer clamps 1 and 3 at a fixed position of the profile cutters 14 and 15 on the movable pincer clamp 3 (FIG. 1).

Figure 2:
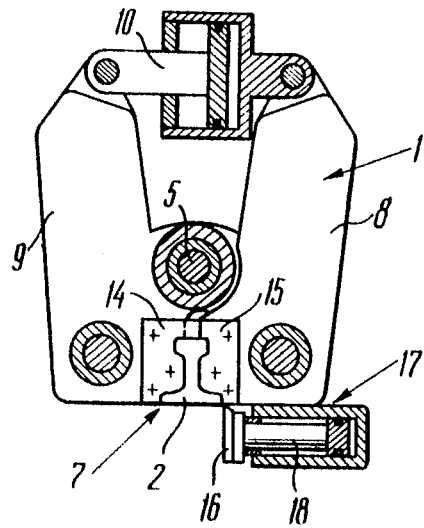
FIG. 2 is a sectional view taken on the line I–I of FIG. 1.

One version of mounting the hydraulic cylinder 17, moving the lower cutter 16, on the clamping jaw 8 of the stationary pincer clamp 1 is shown in FIGS. 1 and 2. In this case, the hydraulic cylinder 17 is disposed in the transverse direction in relation to the rail axis so that the lower cutter 16 secured on the rod 18 and having a cutting edge disposed longitudinally along the rail performs the cutting of the weld burr from the foot of the welded rails 2 and 4 in the transverse direction in relation to the rail axis.

Figure 3:
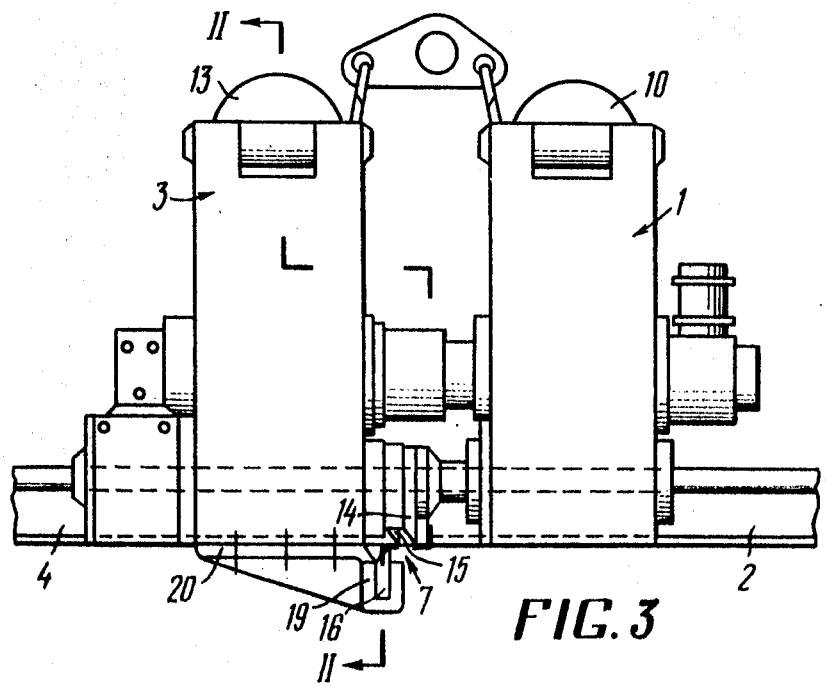
FIG. 3 is a side view of the same machine, wherein the hydraulic cylinder for displacing the lower cutter of the mentioned device is mounted on one clamping jaw of the movable pincer clamp.
Figure 4:
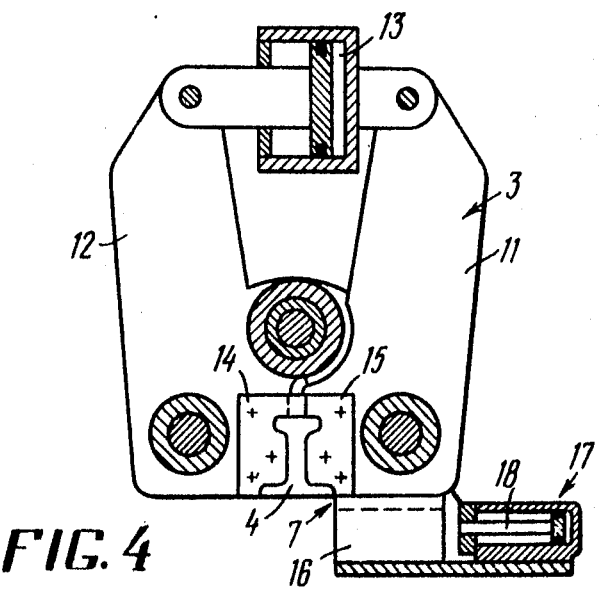
FIG. 4 is a sectional view taken on the line II–II of FIG. 3.

FIGS. 3 and 4 show another version of mounting the hydraulic cylinder 17, displacing the lower cutter 16, on the clamping jaw 11 of the movable pincer clamp 3. In this embodiment, the hydraulic cylinder 17 with its rod 18 connected to the lower cutter 16 is also arranged at right angles to the longitudinal axis of the rail, the cutting edge of the lower cutter 16 being disposed in the same direction. Thus, during the travel of the movable pincer clamp 3 being displaced by the hydraulic cylinder 6 (FIG. 1), the cutting of the weld burr is effected longitudinally along the rail. The lower cutters 16 slide in guides 19 (FIG. 3) secured to the movable pincer clamp 3 through a bracket 20.

Figure 5:
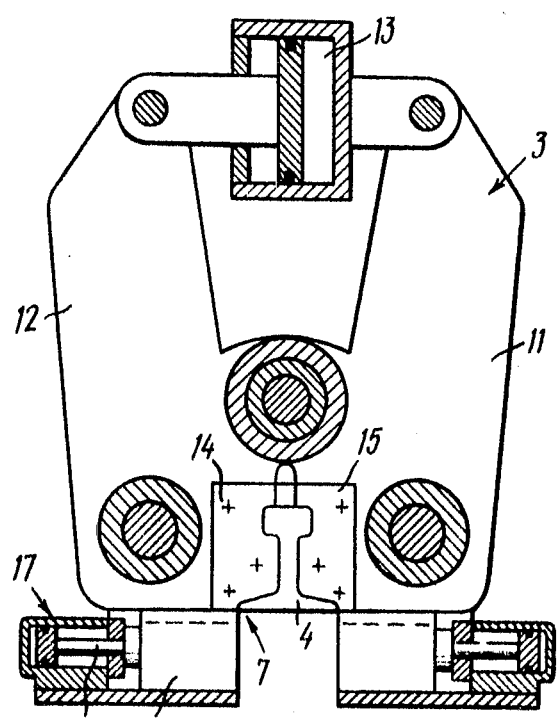
FIG. 5 represents the same machine with the hydraulic cylinders for displacing the lower cutters of the mentioned device mounted on both clamping jaws of the movable pincer clamp, a sectional view taken on the line II–II of FIG. 2.
Figure 6:
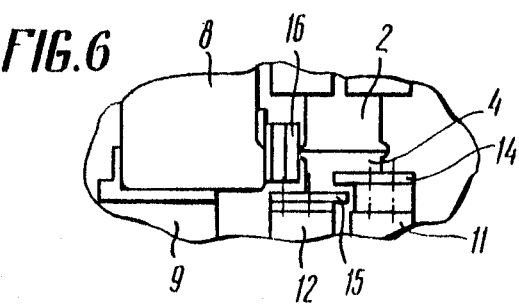
FIG. 6 is an enlarged view of the bottom of FIG. 2, showing the arrangement of the lower and profile cutters of the device for cutting off the weld burr on the clamping jaws.

The embodiment shown in FIG. 5 is a particular case of the arrangement specified above. In this particular embodiment, both clamping jaws 11 and 12 are equipped with hydraulic cylinders 17 whose rods are connected to the lower cutters 16. In this case, both hydraulic cylinders 17 are located in the direction at right angles to the longitudinal axis of the rail, the cutting edges of the lower cutters 16 being disposed in the same direction.

According to the invention, the cutting of the burr of the butt weld is effected as follows.

After the welding operation the clamping jaws 11 and 12 of the movable pincer clamp 3 are slightly turned about the axle 5 by the hydraulic cylinder 13 and fixed in this position. In this case, the distance between the cross outline of the rails and the cutting edge of the profile cutters 14 and 15 mounted on the clamping jaws 11 and 12 is equal to the allowance for the weld dressing after cutting off the burr.

Thereupon, the hydraulic cylinders 6 (FIG. 1), displacing the movable pincer clamp 3, are operated, and the movable pincer clamp 3 together with the profile cutters 14 and 15 mounted on its clamping jaws 11 and 12 are made to travel along the rail towards the weld. The profile cutters 14 and 15 move longitudinally along the rail and cut off the weld burr from the head and side surfaces of the rail. When the travel of the cutters as required for cutting off the burr is completed, the movable pincer clamp 3 is returned to the initial position by the hydraulic cylinders 6.

Thereafter, the hydraulic cylinder 17 is operated. During the movement of the rod 18 of the hydraulic cylinder 17, the lower cutter 16 secured on this rod cuts off the weld burr from the rail foot in the transverse direction in relation to the rail axis. When the travel of the cutters necessary for cutting off the burr is completed, the rod 18 of the hydraulic cylinder 17 is returned to the initial position.

Thus, the removal of the weld burr is completed.

The cutting of the weld burr in the embodiment shown in FIGS. 3 and 4 is effected as follows.

When the welding of the rails is completed, the clamping jaws 11 and 12 of the movable pincer clamp 3 are slightly turned about the axle 5 by the hydraulic cylinder 13 and fixed in this position.

At the same time, pressure is applied to the hydraulic cylinder 17 secured to the clamping jaw 11 of the movable clamp 3. The rod 18 of the hydraulic cylinder 17 together with the lower cutter 16 connected to this rod travels in the transverse direction in relation to the rail axis and moves the cutter to the operating position along the guides 19 secured through the bracket 20 to the clamping jaw 11 of the movable clamp 3.

When these preliminary operations are completed, pressure is applied to the hydraulic cylinders 6 for displacing the movable pincer clamp 3, and this movable clamp 3 together with the profile cutters 14 and 15 secured on its clamping jaws 11 and 12, and the lower cutter 16 arranged in the guides 19 secured to the clamping jaw 11 through the bracket 20, travel along the rail towards the weld. During this travel, the profile cutters 14 and 15 and the lower cutter 16 cut off the burr of the butt weld over the whole contour of the rail in the longitudinal direction.

In the embodiment shown in FIG. 5, the cutting of the weld burr is effected as follows:

All the preliminary operations are carried out as described above.

This embodiment is featured by two hydraulic cylinders 17 secured on the clamping jaws 11 and 12 of the movable pincer clamp, the rods of the hydraulic cylinders being connected to two lower cutters 16. These cutters 16 cut off the weld burr from the rail foot in the direction parallel to the longitudinal axis of the rail when the movable pincer clamp travels towards the weld.

The cutting of the weld burr with the aid of the proposed device, according to the invention, provides the following advantages:

fixing the cutters directly on the clamping jaws of the pincer clamps enables the cutting of the weld burr to be effected during the final stage of the welding operation, i.e. at a higher temperature of the weld as compared with the known methods. Consequently, the forces necessary for cutting off the burr of the weld are much less than in the prior art devices, and this helps to reduce the weight and overall dimensions of the butt-welding machine as well as the time of the operating cycle.

Furthermore, according to the invention, the process of cutting off the burr of the buttweld can easily be automated by means of apparatus that are not described in the present specification.

All these facts contribute to considerably increasing the efficiency of the portable machine for the butt-welding of rails under field conditions.

Though the present invention is described in connection with a preferred embodiment thereof, it should be understood that additional modifications and changes may be made in the construction and arrangement of parts without departing from the idea and scope of the invention as, will be easily understood by those skilled in the art. Such changes and modifications should be considered as falling within the spirit and scope of the invention as defined in the appended claims.

What we claim is:

1. A rail butt-welding transportable machine disposed on a rail under field conditions, comprising in combination a stationary pincer clamp for fixing a first rail to be welded, a movable pincer clamp for fixing another rail to be welded to the first rail, a common axle on which said pincer clamps are mounted, a drive for displacing the movable pincer clamp, a hydraulic cylinder for turning the clamping jaws of the stationary pincer clamp, a hydraulic cylinder for turning the clamping jaws of the movable pincer clamp, at least two profile cutters rigidly secured to the clamping jaws of said movable pincer clamp and having a form contoured to the head and side portions of the rail in the cross section, at least one lower cutter mounted on one of said pincer clamps and adapted to reciprocate transversely in relation to the longitudinal axis of the rail, said lower cutter having a cutting edge which coincides with the plane of the rail foot.

2. A machine according to claim 1, including a further hydraulic cylinder to provide the reciprocating motion for the lower cutter in the transverse direction in relation to the longitudinal axis of the rail, said further hydraulic cylinder being secured to one of the pincer clamps, the rod of said hydraulic cylinder being connected to said cutter.

3. A machine according to claim 1, wherein said further hydraulic cylinder is mounted on one of the clamping jaws of the stationary pincer clamp, the cutting edge of the lower cutter being positioned so that the cutting of the weld burr from the rail foot is made in the transverse direction in relation to the longitudinal axis of the rail.

4. A machine according to claim 1, wherein at least one clamping jaw of the movable pincer clamp is equipped with an additional hydraulic cylinder, said additional hydraulic cylinder having a rod connected to the lower cutter, the cutting edge of said lower cutter being positioned so that the cutting of the weld burr during the travel of the movable pincer clamp is made longitudinally along the rail.

5. A machine, according to claim 4, wherein the lower cutter is arranged in guides secured on the movable pincer clamp with at least one bracket.

6. A machine according to claim 2, wherein said further hydraulic cylinder for displacing the lower cutter is mounted on one of the clamping jaws of the stationary pincer clamp, the cutting edge of the lower cutter being positioned so that the cutting of the weld burr from the rail foot is made in an orthogonal direction to the longitudinal axis of the rail.

7. A machine according to claim 2, wherein at least one clamping jaw of the movable pincer clamp is equipped with an additional hydraulic cylinder, said additional hydraulic cylinder having a rod connected to the lower cutter, the cutting edge of said lower cutter being positioned so that the cutting of the weld burr during the travel of the movable pincer clamp is made longitudinally along the rail.

8. A machine according to claim 7, wherein the lower cutter is arranged in guides secured on the movable pincer clamp with at least one bracket.